(12) United States Patent
Kobayashi (10) Patent No.: US 11,073,078 B2
(45) Date of Patent: Jul. 27, 2021

(54) ENGINE

(71) Applicant: HONDA MOTOR CO., LTD., Tokyo (JP)

(72) Inventor: Tetsuya Kobayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/041,779

(22) PCT Filed: Mar. 30, 2018

(86) PCT No.: PCT/JP2018/013895
§ 371 (c)(1),
(2) Date: Sep. 25, 2020

(87) PCT Pub. No.: WO2019/187116
PCT Pub. Date: Oct. 3, 2019

(65) Prior Publication Data
US 2021/0047962 A1    Feb. 18, 2021

(51) Int. Cl.
*F02B 67/04* (2006.01)
*F02F 7/00* (2006.01)
(Continued)

(52) U.S. Cl.
CPC ............ *F02B 67/04* (2013.01); *F02F 7/0039* (2013.01); *F16C 3/06* (2013.01); *A01D 34/6806* (2013.01)

(58) Field of Classification Search
CPC .... F02B 67/04; F02B 75/007; F02B 2275/28; F02F 7/00; F02F 7/0043; F02F 7/0065;
(Continued)

(56) References Cited

U.S. PATENT DOCUMENTS 4,433,964 A * 2/1984 Holtzberg ............... F02B 67/06
123/90.31
4,607,601 A * 8/1986 Kohler ................... F02F 7/0043
123/90.31
(Continued)

FOREIGN PATENT DOCUMENTS

JP    H08-260957 A    10/1996
JP    2000-038957 A    2/2000
(Continued)

OTHER PUBLICATIONS

Jun. 19, 2018, International Search Report issued for related PCT application No. PCT/JP2018/013895.
(Continued)

*Primary Examiner* — Grant Moubry
*Assistant Examiner* — James G Moubry
(74) *Attorney, Agent, or Firm* — Paratus Law Group, PLLC (57) ABSTRACT

An engine includes a crankshaft and a timing gear to be attached to the crankshaft so as to rotate integrally with the crankshaft. A fitting projection is provided on either one of the crankshaft and the timing gear, and a fitting recess to be fitted with the fitting projection, and erroneous-assembling prevention ribs to sandwich the fitting recess in a circumferential direction are provided on the other one of the crankshaft and the timing gear.

5 Claims, 12 Drawing Sheets

(51) Int. Cl.
*F16C 3/06* (2006.01)
*A01D 34/68* (2006.01)

(58) Field of Classification Search
CPC ....... F02F 7/0068; F16C 3/06; F16C 2360/22; F16C 2226/76; F16C 2226/80; F16C 2361/61; F16D 1/06
See application file for complete search history.

(56) References Cited

U.S. PATENT DOCUMENTS

| | | | | |
|---|---|---|---|---|
| 6,173,689 | B1* | 1/2001 | Tanaka | F01L 1/02 123/90.33 |
| 6,250,273 | B1 | 6/2001 | Ryu et al. | |
| 6,349,688 | B1* | 2/2002 | Gracyalny | F01L 1/024 123/90.16 |
| 6,672,271 | B2* | 1/2004 | Nomura | F02F 7/0053 123/195 R |
| 6,973,903 | B2* | 12/2005 | Santi | F01L 1/12 123/90.39 |
| 9,845,861 | B1* | 12/2017 | Hucker | F16H 57/12 |
| 2002/0108595 | A1 | 8/2002 | Gracyalny | |
| 2002/0108596 | A1 | 8/2002 | Gracyalny et al. | |
| 2002/0185093 | A1 | 12/2002 | Immel et al. | |
| 2003/0000493 | A1 | 1/2003 | Gracyalny et al. | |
| 2003/0024495 | A1 | 2/2003 | Gracyalny et al. | |
| 2004/0031458 | A1 | 2/2004 | Snyder et al. | |
| 2004/0094113 | A1 | 5/2004 | Honda et al. | |
| 2004/0112321 | A1 | 6/2004 | Gracyalny et al. | |
| 2005/0229893 | A1 | 10/2005 | Miyake et al. | |
| 2012/0073527 | A1 | 3/2012 | Oltmans et al. | |
| 2013/0133612 | A1 | 5/2013 | Mori et al. | |
| 2014/0109863 | A1* | 4/2014 | Vaughn | F01L 1/022 123/197.4 |

FOREIGN PATENT DOCUMENTS

| | | |
|---|---|---|
| JP | 2000-170542 A | 6/2000 |
| JP | 2003-522891 A | 7/2003 |
| JP | 2004-060453 A | 2/2004 |
| JP | 2005-120973 A | 5/2005 |
| JP | 2013-113223 A | 6/2013 |

OTHER PUBLICATIONS

Jun. 19, 2018, International Search Opinion issued for related PCT application No. PCT/JP2018/013895.

* cited by examiner

ENGINE

CROSS REFERENCE TO PRIOR APPLICATION

This application is a National Stage Patent Application of PCT International Patent Application No. PCT/JP2018/013895 (filed on Mar. 30, 2018) under 35 U.S.C. § 371, which is hereby incorporated by reference in its entirety.

TECHNICAL FIELD

The present invention relates to an engine that can be installed in a work machine such as a lawnmower and a high-pressure washer.

BACKGROUND ART

Patent Literature 1 describes an engine including a crankshaft, a timing gear to be attached to the crankshaft so as to rotate integrally with the crankshaft, and a valve mechanism for causing an intake valve and an exhaust valve to operate in accordance with the rotation of a camshaft that meshes with the timing gear. In this type of engine, a fitting projection is provided on either one of the crankshaft and the timing gear, and a fitting recess to be fitted with the fitting projection is provided on the other one of the crankshaft and the timing gear. When the crankshaft and the timing gear are assembled such that the fitting projection is fitted into the fitting recess, the crankshaft and the timing gear are connected at a predetermined position in the circumferential direction and are integrally rotated without positional displacement.

CITATION LIST

Patent Literature

Patent Literature 1: JP-A-2000-38957

SUMMARY OF INVENTION

Technical Problem

When the crankshaft and the timing gear are erroneously assembled, the fitting projection is not fitted into the fitting recess. Accordingly, displacement occurs at an assembly position relatively by only the height of the fitting projection, and it is possible to recognize that the crankshaft and the timing gear are in an erroneous-assembling state based on the displacement. However, due to the height of the fitting projection, it is difficult to see the displacement of the assembly position even if the crankshaft and the timing gear are erroneously assembled, and the erroneous-assembling may not be noticed.

The present invention provides an engine in which the erroneous assembling of a crankshaft and a timing gear can be easily recognized.

Solution to Problem

According to the present invention, there is provided an engine including:
a crankshaft; and
a timing gear to be attached to the crankshaft so as to rotate integrally with the crankshaft,
in which a fitting projection is provided on either one of the crankshaft and the timing gear, and a fitting recess to be fitted with the fitting projection, and erroneous-assembling prevention ribs to sandwich the fitting recess in a circumferential direction are provided on the other one of the crankshaft and the timing gear.

Advantageous Effects of Invention

According to the present invention, when the crankshaft and the timing gear are erroneously assembled, relative positional displacement occurs between the crankshaft and the timing gear by the height of the erroneous-assembling prevention ribs in addition to the height of the fitting projection, so that the erroneous assembling can be easily recognized.

DESCRIPTION OF EMBODIMENTS

An embodiment of the present invention will be described below with reference to FIGS. 1 to 8. An engine E according to the present embodiment is a small-sized general-purpose engine installed in a walk-behind lawnmower or the like and constitutes an OHV engine. For simplicity and clarity of description in the present specification, an axial direction of a crankshaft 2 is defined as an up-down direction (first direction), a direction which is perpendicular to the up-down direction and in which a cylinder part 1b extends is defined as a front-rear direction (second direction), and a direction perpendicular to the up-down direction and the front-rear direction is defined as a left-right direction. In the drawings, the front, the rear, the left side, the right side, the upper side, and the lower side of the engine E are indicated as Fr, Rr, L, R, U, and D, respectively.

Figure 1:
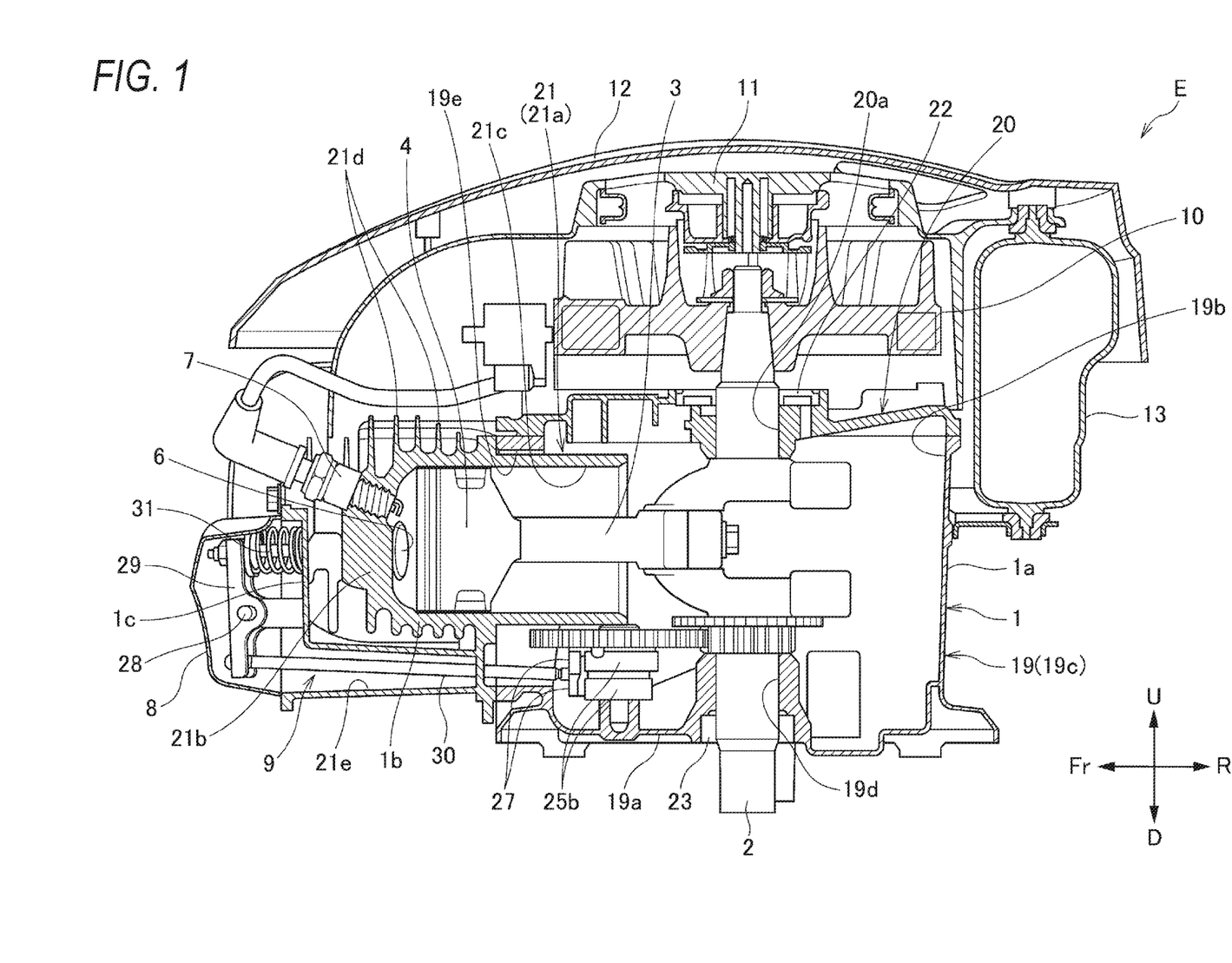
FIG. 1 is a cross-sectional view of an engine according to one embodiment of the present invention.
Figure 2:
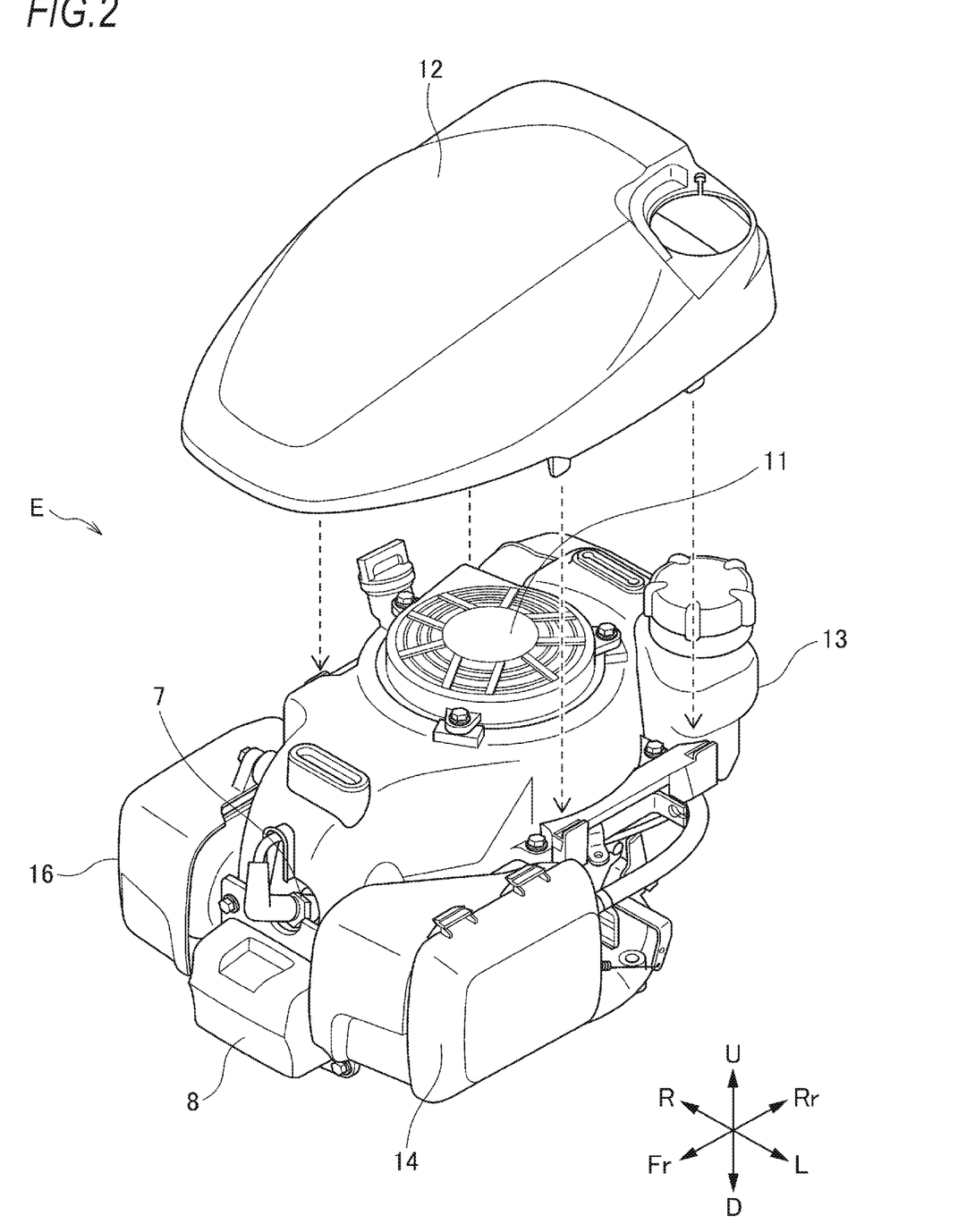
FIG. 2 is a perspective view of the engine with a top cover removed, as viewed from a front oblique upper side.
Figure 3:
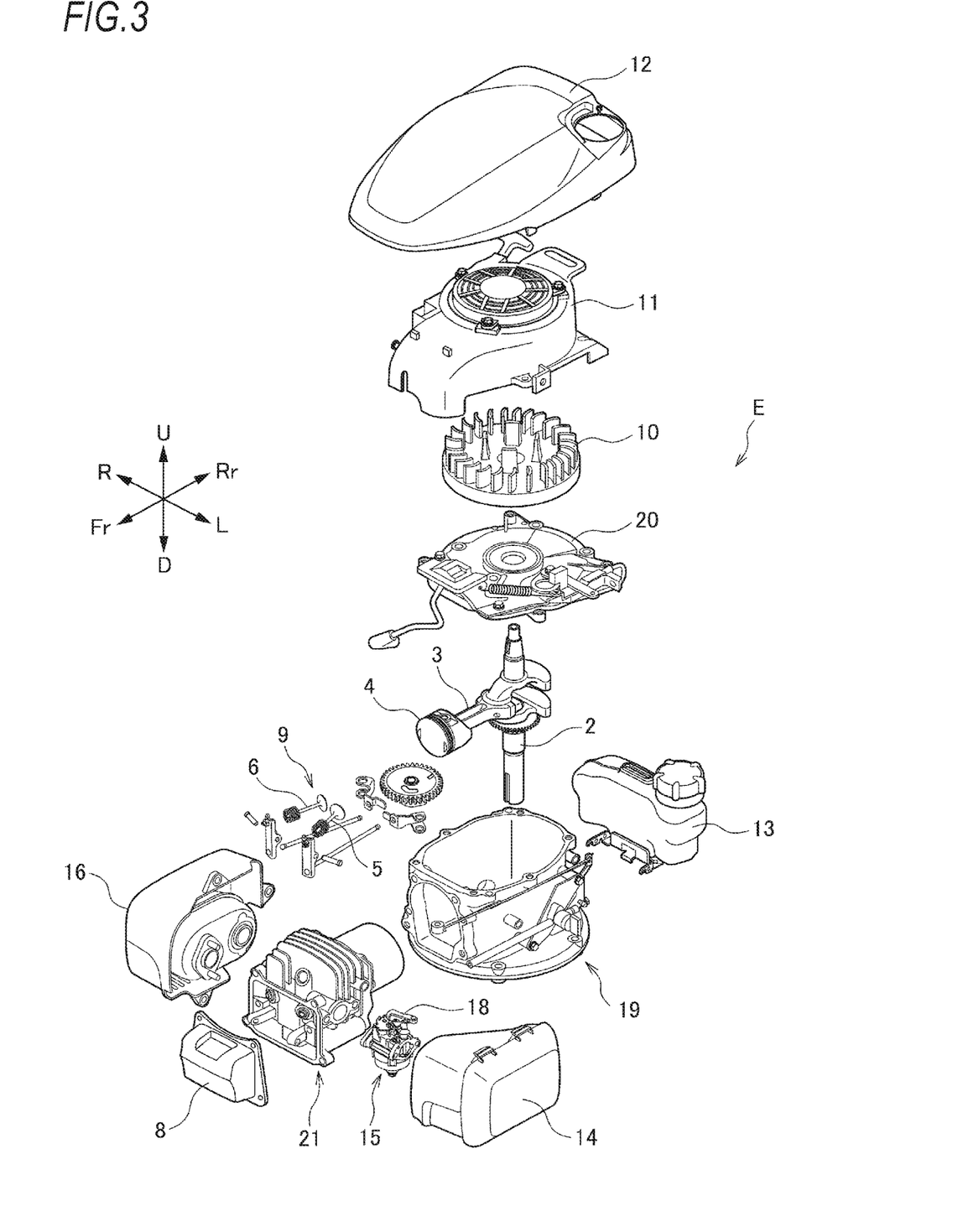
FIG. 3 is an exploded perspective view of the engine as viewed from the front oblique upper side.

As illustrated in FIGS. 1 to 3, the engine E according to the present embodiment includes an engine body 1 including a crankcase part 1a and the cylinder part 1b, the crankshaft 2 that is rotatably supported by the crankcase part 1a in the up-down direction, a piston 4 that is slidably fitted into the cylinder part 1b and is connected to the crankshaft 2 via a connecting rod 3, an intake valve 5, an exhaust valve 6, and a spark plug 7 that are provided on a head part 1c of the cylinder part 1b, a head cover 8 that covers the head part 1c of the cylinder part 1b, a valve mechanism 9 that causes the intake valve 5 and the exhaust valve 6 to operate in accordance with the rotation of the crankshaft 2, a flywheel 10 that is connected to an upper end portion of the crankshaft 2, a recoil starter 11 that is disposed above the flywheel 10 and performs start operation of the engine E, a top cover 12 that covers an upper portion of the engine E, a fuel tank 13 that stores fuel, an air cleaner 14 that purifies air, a carburetor 15 that generates a mixed gas including fuel and air and supplies the mixed gas into the cylinder part 1b, a muffler 16 that discharges exhaust gas discharged from the cylinder part 1b while silencing the exhaust gas, a governor mechanism 17 (see FIGS. 5 and 6) that automatically opens and closes a throttle valve (not illustrated) of the carburetor 15 in accordance with the rotational speed of the crankshaft 2, and an auto choke mechanism 18 that automatically opens and closes a choke valve (not illustrated) of the carburetor 15 in accordance with the temperature of the engine body 1.

[Engine Body]

Figure 4:
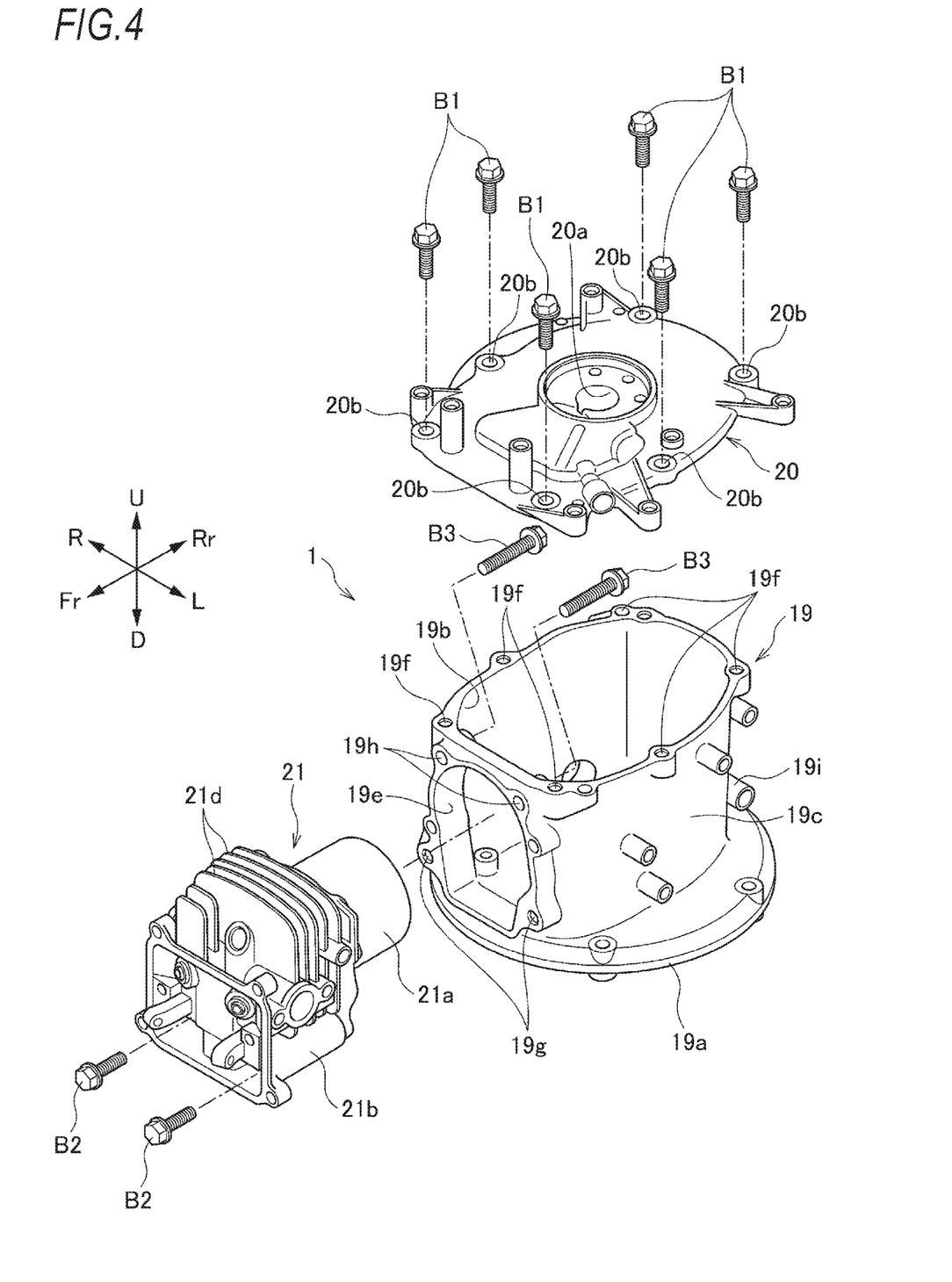
FIG. 4 is an exploded perspective view of an engine body as viewed from the front oblique upper side.

As illustrated in FIG. 4, the engine body 1 includes a crankcase body 19, a crankcase cover 20, and a cylinder unit 21.

Figure 5:
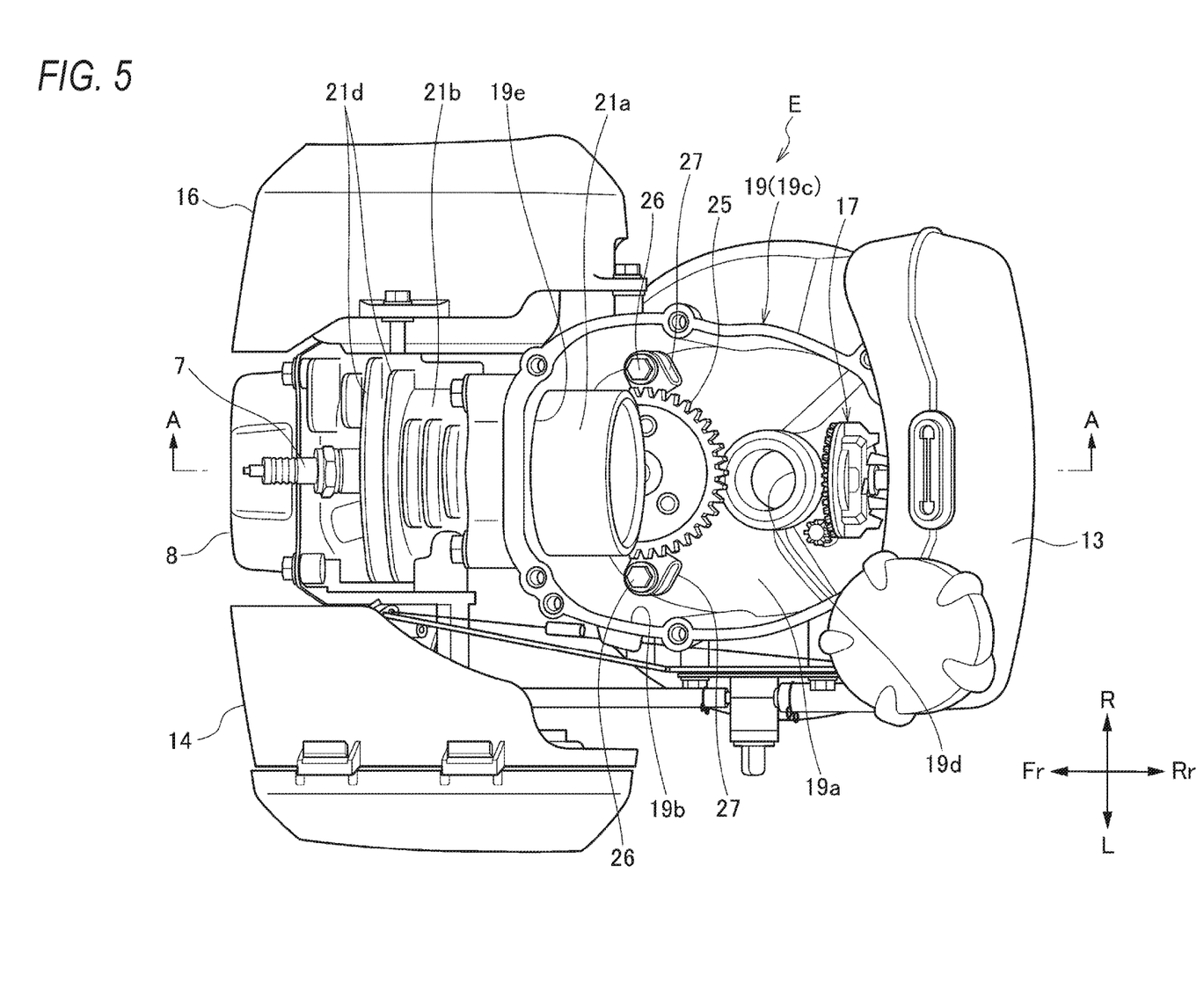
FIG. 5 is a plan view of the engine with a crankcase cover removed.
Figure 6:
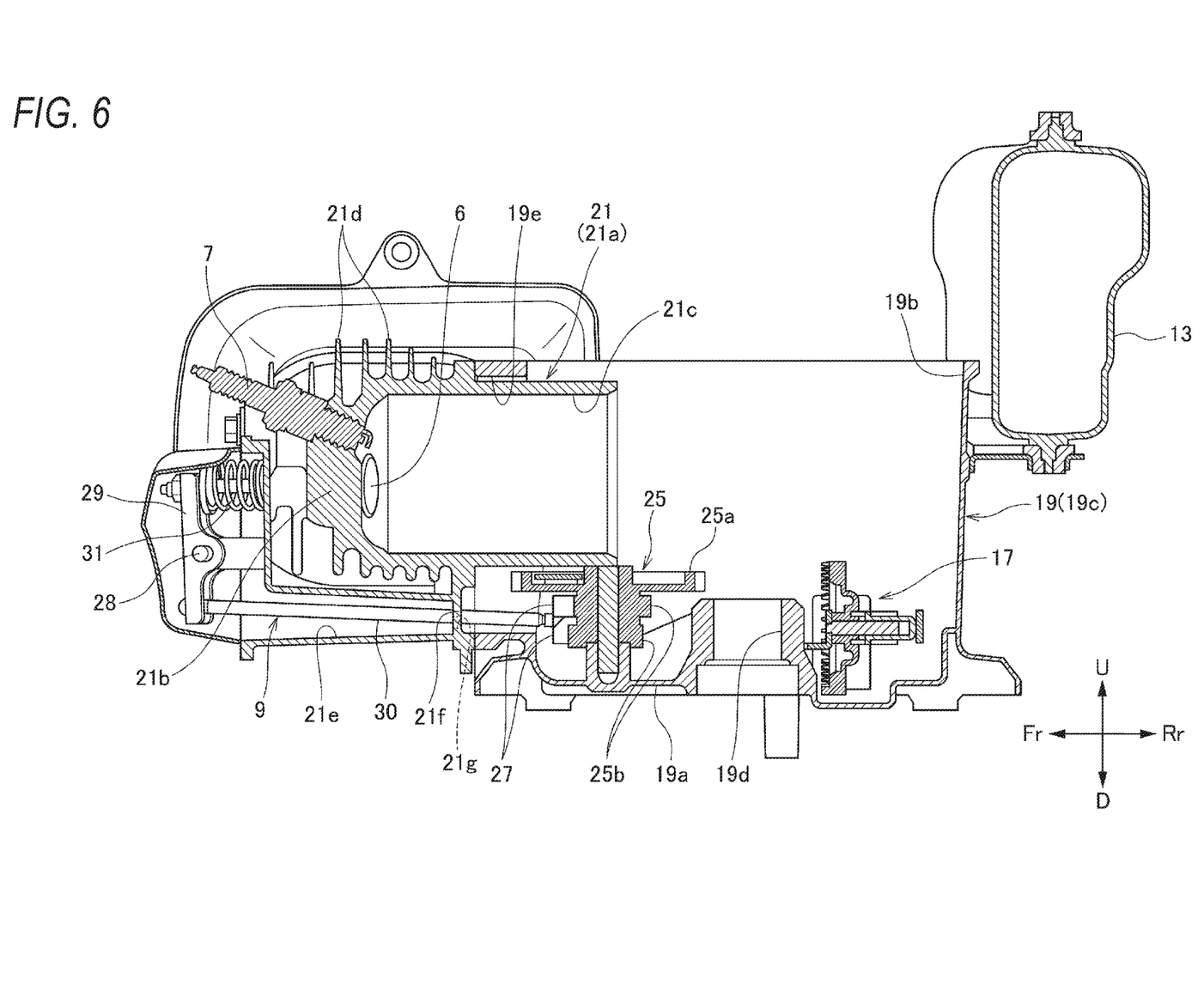
FIG. 6 is a sectional view taken along a line A-A of FIG. 5.

As illustrated in FIGS. 4 to 6, the crankcase body 19 includes a bottom portion 19a, and a tubular portion 19c that is formed integrally with the bottom portion 19a at a lower end portion thereof and includes a case opening portion 19b at an upper end portion thereof. On a center portion of the bottom portion 19a, a first crankshaft insertion hole 19d through which a lower end side of the crankshaft 2 is inserted is formed. On a front surface portion of the tubular portion 19c, a cylinder insertion hole 19e through which a cylinder base portion 21a of the cylinder unit 21 is inserted is formed. In FIG. 4, the reference numeral 19i denotes a drain opening through which oil accumulated in the crankcase part 1a is discharged.

As illustrated in FIG. 4, the crankcase cover 20 covers the case opening portion 19b of the crankcase body 19 and constitutes the crankcase part 1a of the engine body 1 together with the crankcase body 19. On a center portion of the crankcase cover 20, a second crankshaft insertion hole 20a through which an upper end side of the crankshaft 2 is inserted is formed. Returning to FIG. 1, the crankshaft 2 is rotatably supported between a second bearing 22 provided adjacent to the second crankshaft insertion hole 20a of the crankcase cover 20 and a first bearing 23 provided adjacent to the first crankshaft insertion hole 19d of the crankcase body 19.

The crankcase cover 20 is detachably attached to an upper end portion of the crankcase body 19 via a plurality of bolts B1. Specifically, a plurality of bolt insertion holes 20b through which the bolts B1 are inserted from above are formed at a peripheral portion of the crankcase cover 20, and on the other hand, a plurality of bolt fastening holes 19f to which the bolts B1 are fastened from above are formed at the upper end portion of the crankcase body 19. By fastening the bolts B1 to the bolt fastening holes 19f via the bolt insertion holes 20b, the crankcase cover 20 can be attached to the crankcase body 19, and conversely, by releasing the fastening of the bolts B1 to the bolt fastening holes 19f, the crankcase cover 20 can be removed from the crankcase body 19.

According to the crankcase body 19 and the crankcase cover 20, during the maintenance of the engine E, the inside of the crankcase body 19 can be accessed from above by removing the crankcase cover 20. In particular, when replacing the crankshaft 2, the crankshaft 2 can be easily replaced by removing the crankcase cover 20 and extracting the crankshaft 2. The erroneous-assembling prevention mechanism for the assembly of the crankshaft 2 will be described below.

As illustrated in FIGS. 4 to 6, the cylinder unit 21 includes the cylinder base portion 21a that is inserted to the cylinder insertion hole 19e of the crankcase body 19 from the front and is to be positioned inside the crankcase body 19, and a cylinder block 21b that extends forward from the cylinder base portion 21a and is to be positioned outside the crankcase body 19. The cylinder unit 21 alone constitutes the cylinder part 1b of the engine body 1, and a front end portion of the cylinder block 21b constitutes the head part 1c. Inner surfaces of cylindrical portions of the cylinder base portion 21a and the cylinder block 21h constitute a cylinder bore 21c that is a sliding surface with the piston 4, and a large number of cooling fins 21d protrude from an outer peripheral portion of the cylinder block 21b.

According to the cylinder unit 21, when a plurality of types of cylinder units 21 having different bore diameters are provided, it is possible to provide the engine body 1 having different exhaust amounts simply by replacing the cylinder unit 21 while sharing the crankcase body 19 and the crankcase cover 20.

The cylinder unit 21 is detachably attached to the crankcase body 19 via a plurality of bolts B2 and B3. For example, a plurality of bolt insertion holes (not illustrated) through which the bolts B2 are inserted from the front are formed at a rear end portion of the cylinder block 21b, and on the other hand, a plurality of bolt fastening holes 19g to which the bolts B2 are fastened from the front are formed at a front end portion of the crankcase body 19. By fastening bolts B2 to the bolt fastening holes 19g via the bolt insertion holes of the cylinder block 21b, the cylinder unit 21 can be attached to the crankcase body 19, and conversely, by releasing the fastening of the bolts B2 to the bolt fastening holes 19g, the cylinder unit 21 can be removed from the cylinder unit 21.

However, in the engine body 1 according to the present embodiment, when the cylinder unit 21 is detachably attached to the crankcase body 19 via the plurality of bolts B2 and B3, the bolts B3 on the upper end portion side are fastened to the cylinder unit 21 from the inside of the crankcase body 19. Specifically, a plurality of bolt insertion holes 19h through which the bolts B3 are inserted frontward from the inside of the crankcase body 19 are formed at the front end portion of the crankcase body 19, and on the other hand, a plurality of bolt fastening holes (not illustrated) to which the bolts B3 are fastened from the rear are formed at the rear end portion of the cylinder block 21b. The bolts B3 are fastened to the bolt fastening holes of the cylinder block 21b via the bolt insertion holes 19h of the crankcase body 19.

According to the attachment structure of the cylinder unit 21, it is not required to form in a space for fastening the bolts B3 from the front on at least the upper end portion side of the cylinder block 21b. Accordingly, the cylinder unit 21 can be attached to the crankcase body 19 without interfering with the external structure (for example, the cooling fins 21d) of the cylinder block 21b, and the cooling performance and the like of the engine E can be improved.

[Valve Mechanism]

Figure 7:
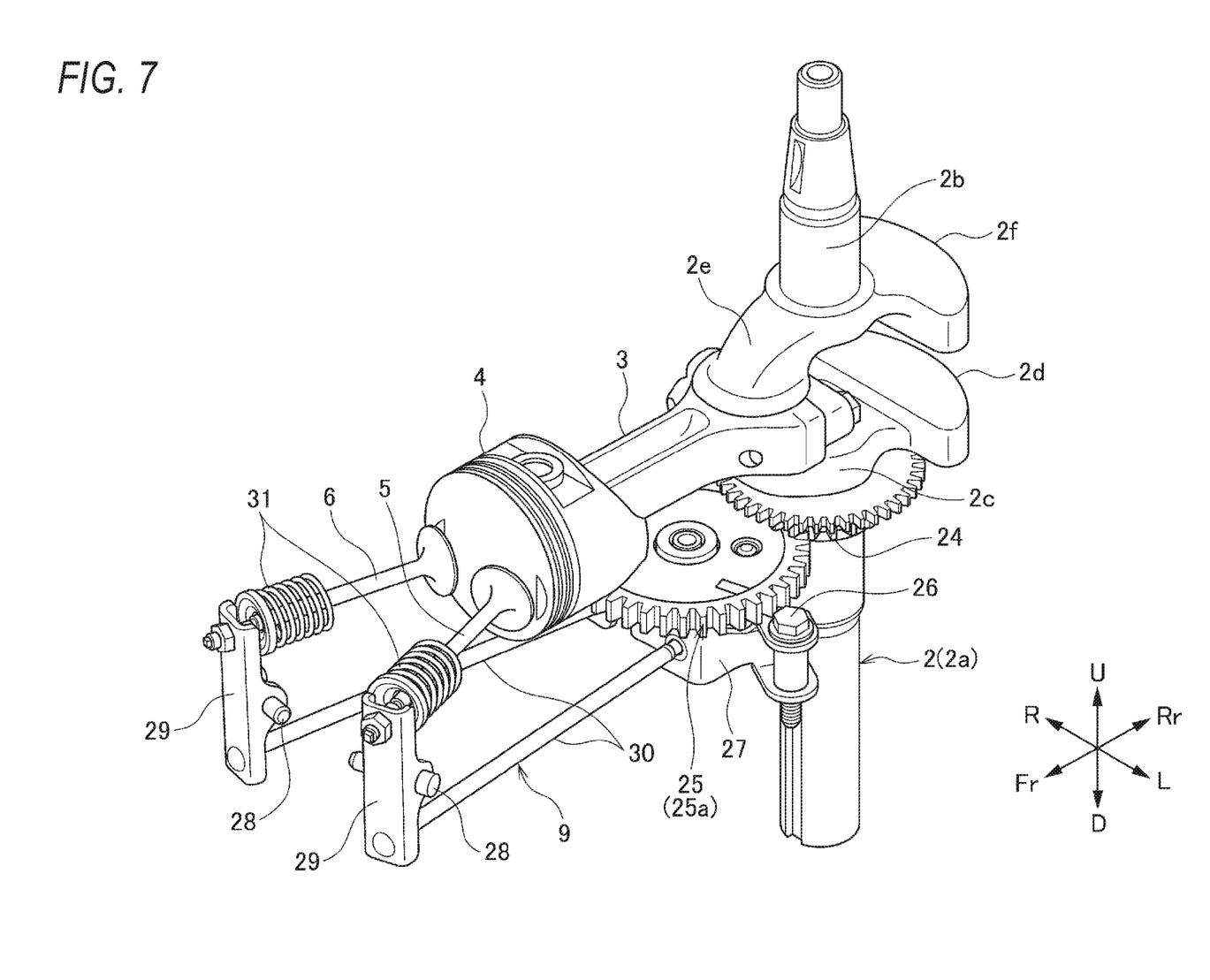
FIG. 7 is a perspective view of a valve mechanism of the engine as viewed from the front oblique upper side.
Figure 8:
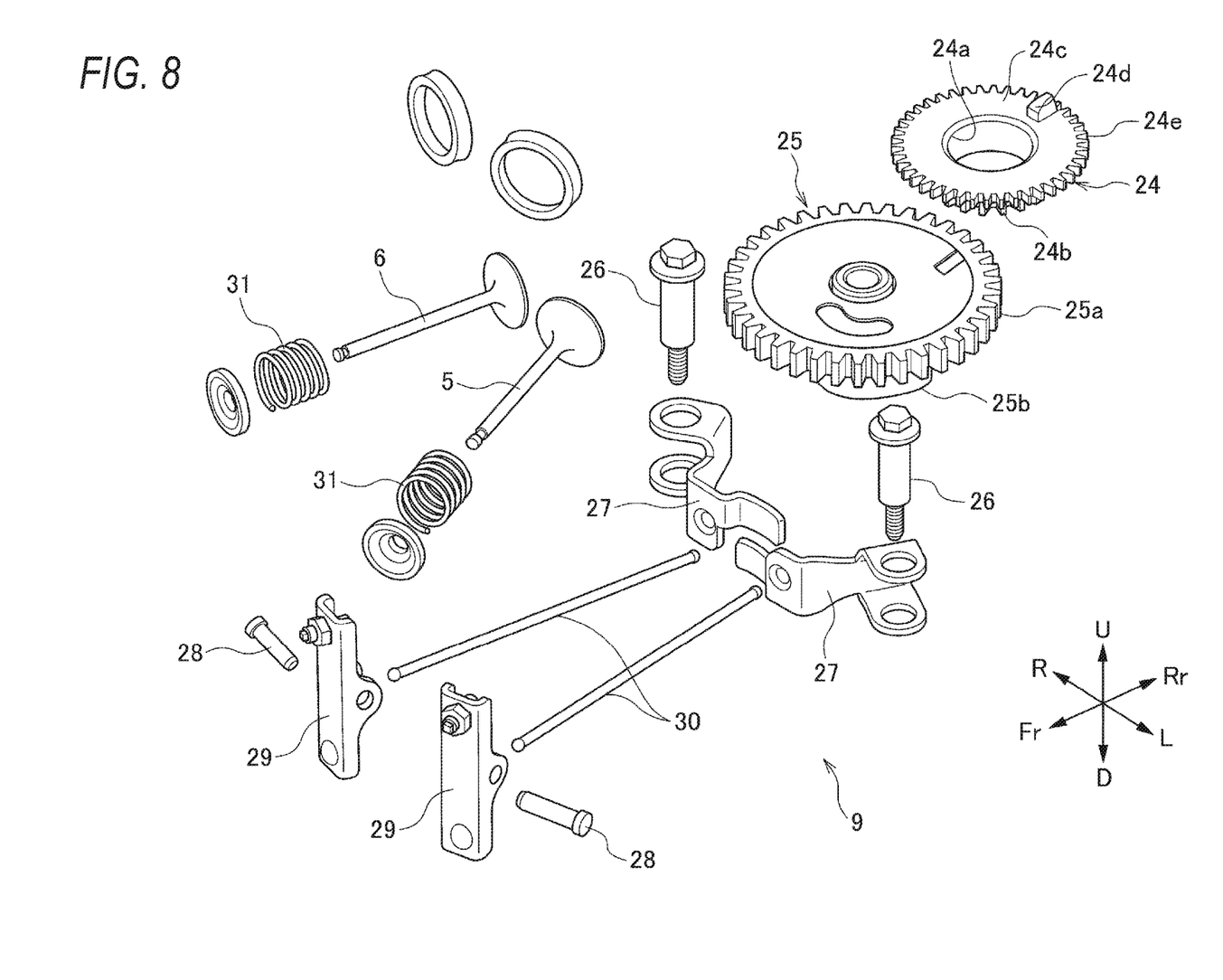
FIG. 8 is an exploded perspective view of the valve mechanism of the engine as viewed from the front oblique upper side.

As illustrated in FIGS. 6 to 8, the valve mechanism 9 includes a timing gear 24 to be assembled to the crankshaft 2 in an integrally rotatable manner, a camshaft 25 rotatably supported by the bottom portion 19a of crankcase body 19, a pair of lifters 27 that are swingably supported by the bottom portion 19a of the crankcase body 19 via stepped bolts 26, a pair of rocker arms 29 which are swingably supported by the front end portion of the cylinder block 21b via rocker arm shafts 28, and whose one end portion abuts against a front end portion of the intake valve 5 or the exhaust valve 6, a pair of push rods 30 that are accommodated in a push rod accommodation portion 21e formed on a lower portion of the cylinder unit 21 and respectively connect the lifters 27 to the other end portions of the pair of rocker arms 29, and a pair of valve springs 31 that respectively urge the intake valve 5 and the exhaust valve 6 in a valve closing direction.

The camshaft 25 includes gear portions 25a that mesh with the timing gear 24 and are driven to rotate at a speed reduction ratio of ½ by the timing gear 24, and cam portions 25b that press the pair of lifters 27 alternately in accordance with the rotation drive of the gear portions 25a. When the cam portion 25b presses the lifter 27, the other end portion of the corresponding rocker arm 29 is pressed via the push rod 30, and the intake valve 5 or the exhaust valve 6 connected to one end portion of the rocker arm 29 is opened. On the other hand, when the pressing of the lifter 27 by the cam portion 25b is released, the intake valve 5 or the exhaust valve 6 is closed by the urging force of the valve spring 31.

The camshaft 25 according to the present embodiment is disposed below the cylinder base portion 21a of the cylinder unit 21. When the camshaft 25 is disposed in this way, the inside of the crankcase body 19 can be accessed from above only by removing the crankcase cover 20 even without removing the camshaft 25 during the maintenance of the engine E.

In FIG. 6, the reference numeral 21g denotes a communication hole provided in a rear wall 21f of the push rod accommodation portion 21e. The communication hole 21g is provided at a position that is the lowest portion when oil accumulated inside the crankcase part 1a is discharged outward from the drain opening 19i of the crankcase body 19, and guides and discharges oil accumulated in the head part 1c and the push rod accommodation portion 21e to the crankcase part 1a. Therefore, it is possible to more reliably prevent the oil from accumulating in the push rod accommodation portion 21e during the discharging of the oil.

[Erroneous-Assembling Prevention Mechanism]

Next, an erroneous-assembling prevention mechanism of the crankshaft 2 and the timing gear 24 will be described with reference to FIGS. 7 to 10B.

As illustrated in FIGS. 7 to 10B, the crankshaft 2 includes a first shaft portion 2a whose lower end side is to be inserted into the first crankshaft insertion hole 19d, a second shaft portion 2b whose upper end side is to be inserted into the second crankshaft insertion hole 20a, a first crank arm portion 2c that extends in an outer diameter direction from an upper end portion of the first shaft portion 2a, a first counterweight portion 2d that extends in a direction opposite to the extending direction of the first crank arm portion 2c from the upper end portion of the first shaft portion 2a, a second crank arm portion 2e that extends in the outer diameter direction from a lower end portion of the second shaft portion 2b, a second counterweight portion 2f that extends in a direction opposite to the extending direction of the second crank arm portion 2e from the lower end portion of the second shaft portion 2b, and a crank pin 2g that connects distal end portions of the first crank arm portion 2c and the second crank arm portion 2e, and the piston 4 is connected to the crank pin 2g via the connecting rod 3.

The timing gear 24 includes an insertion hole 24a through which the first shaft portion 2a of the crankshaft 2 is inserted, gear portions 24b that mesh with the gear portions 25a of the camshaft 25, a flange portion 24c that extends in an outer diameter direction from upper end portions of the gear portions 24b, a fitting projection 24d formed on an upper surface of the flange portion 24c, and large-diameter gear portions 24e that are formed on an outer peripheral surface of the flange portion 24c and mesh with the governor mechanism 17.

The crankshaft 2 and the timing gear 24 are assembled by inserting the first shaft portion 2a of the crankshaft 2 into the insertion hole 24a of the timing gear 24 and fitting the fitting projection 24d formed on the flange portion 24c of the timing gear 24 into a fitting recess 2h formed on a lower surface of the first counterweight portion 2d of the crankshaft 2.

Figure 9A:
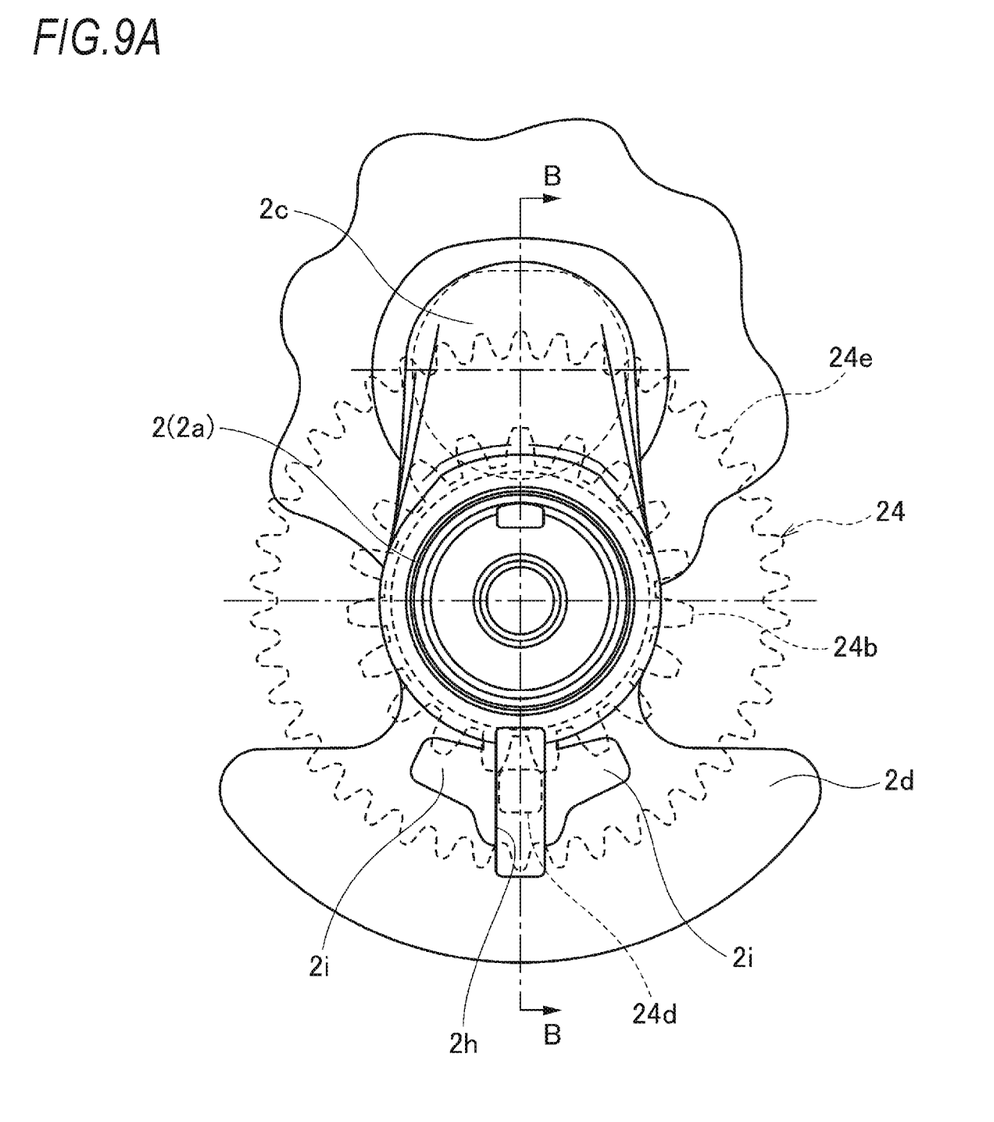
FIG. 9A is a view for illustrating an erroneous-assembling prevention mechanism of the engine in a state where a crankshaft and a timing gear are correctly assembled.
Figure 9B:
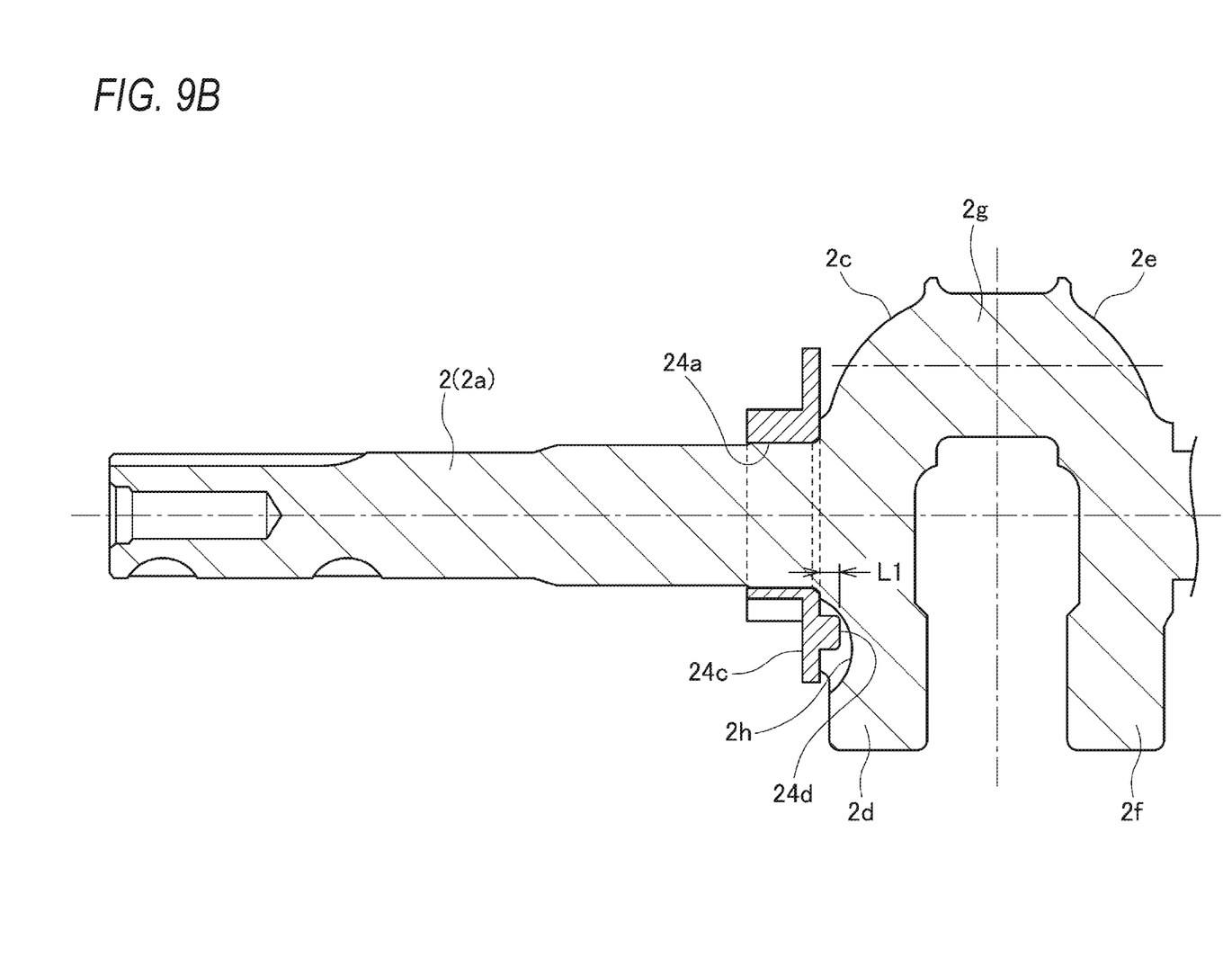
FIG. 9B is a sectional view taken along a line B-B of FIG. 9A.

Only one fitting projection 24d and one fitting recess 2h are formed in a circumferential direction, so that the crankshaft 2 and the timing gear 24 can be connected at a predetermined position in the circumferential direction, and can be integrally rotated without positional displacement by fitting the fitting projection 24d into the fitting recess 2h as illustrated in FIGS. 9A and 99.

Figure 10A:
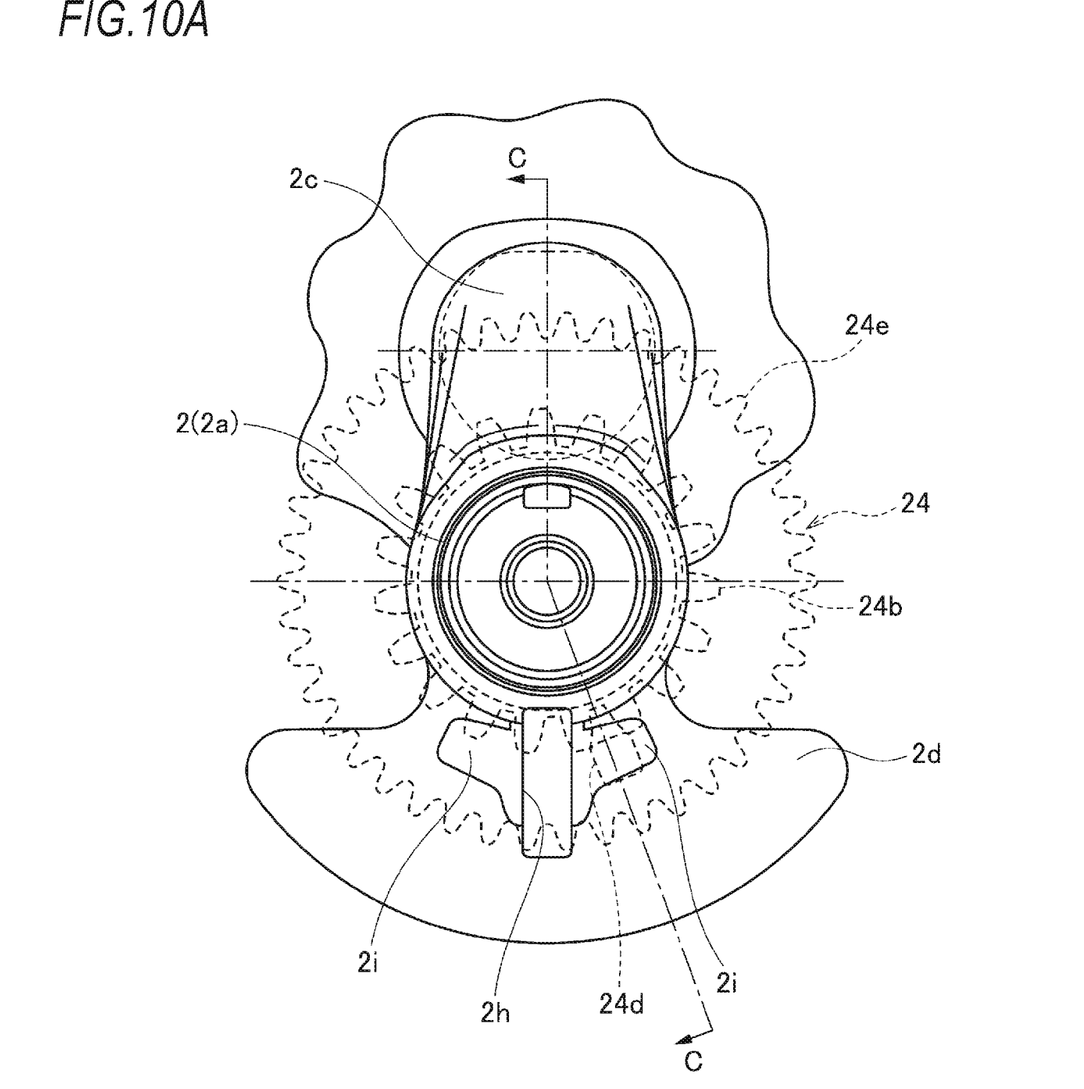
FIG. 10A is a view for illustrating the erroneous-assembling prevention mechanism of the engine in a state where a crankshaft and a timing gear are erroneously assembled.
Figure 10B:
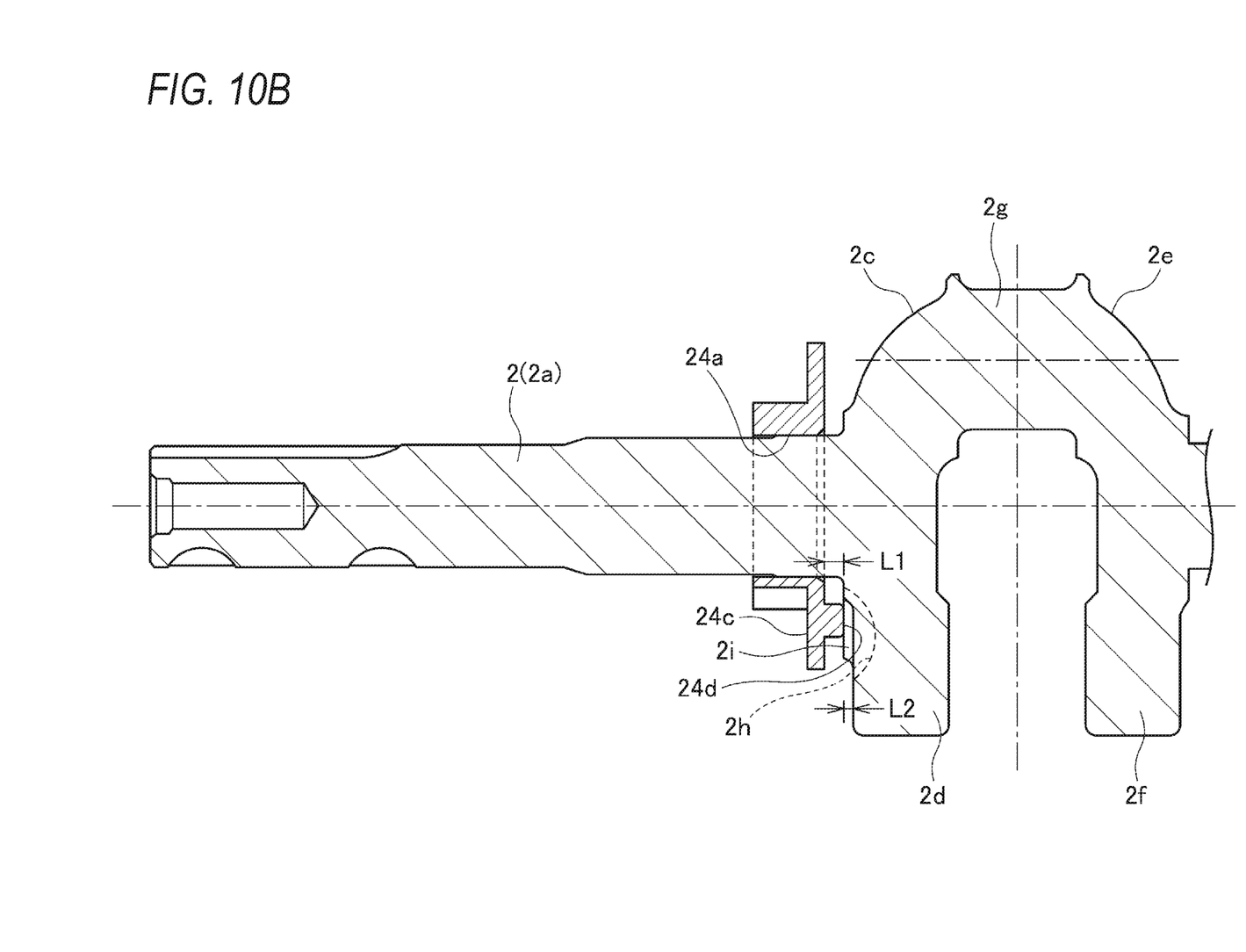
FIG. 10B is a sectional view taken along a line C-C of FIG. 10A.

During the assembly of the crankshaft 2 and the timing gear 24, erroneous-assembling states where the fitting projection 24d and the fitting recess 2h are slightly displaced in the circumferential direction may occur as illustrated in FIGS. 10A and 10B. In this case, the fitting projection 24d is not fitted into the fitting recess 2h and abuts against the lower surface of the first counterweight portion 2d, and positional displacement corresponding to a height L1 of the fitting projection 24d in the axial direction may occur between the crankshaft 2 and the timing gear 24. Accordingly, the erroneous assembling may be recognized based on the positional displacement, but due to the height of the fitting projection, it is difficult to see the displacement of the assembly positions even if the crankshaft 2 and the timing gear 24 are erroneously assembled, and the erroneous assembling may not be noticed.

In the engine E according to the embodiment of the present invention, two erroneous-assembling prevention ribs 2i are provided on the lower surface of the first counterweight part 2d provided with the fitting recess 2h so as to sandwich the fitting recess 2h in the circumferential direction. According to the erroneous-assembling prevention ribs 2i, during the assembly of the crankshaft 2 and the timing gear 24, the fitting projection 24d abuts against the erroneous-assembling prevention ribs 2i when erroneous-assembling states where the fitting projection 24d and the fitting recess 2h are slightly displaced in the circumferential direction occur as illustrated in FIGS. 10A and 10B. Accordingly, positional displacement corresponding to a combination of the height L1 of the fitting projection 24d and a height L2 of the erroneous-assembling prevention rib 2i in the axial direction occurs between the crankshaft 2 and the timing gear 24. As a result, the erroneous assembling is easily recognized as compared with the related art in which the positional displacement only corresponding to the height L1 of the fitting projection 24d occurs.

The above-described embodiment can be appropriately modified, improved, or the like. For example, in the above-described embodiment, the fitting projection 24d is provided on the timing gear 24, and the fitting recess 2h and the erroneous-assembling prevention ribs 2i are provided on the crankshaft 2. Alternatively, the fitting recess and the erroneous-assembling prevention ribs may be provided on the timing gear 24, and the fitting projection may be provided on the crankshaft 2.

The front-rear direction is described as the second direction in the above-described embodiment, and the second direction may be a left-right direction.

In the above-described embodiment, the cylinder unit 21 is detachably attached to the crankcase body 19. Alternatively, the cylinder unit 21 may be formed integrally with the crankcase body 19.

At least the following matters are described in the present description. Although the corresponding constituent elements or the like in the above-described embodiment are shown in parentheses, the present invention is not limited thereto.

(1) An engine (an engine E) includes
a crankshaft (a crankshaft 2), and
a timing gear (a timing gear 24) to be attached to the crankshaft so as to rotate integrally with the crankshaft,
in which a fitting projection (a fitting projection 24d) is provided on either one of the crankshaft and the timing gear, and
a fitting recess (a fitting recess 2h) to be fitted into the fitting projection, and erroneous-assembling prevention ribs (erroneous-assembling prevention ribs 2i) to sandwich the fitting recess in a circumferential direction are provided on the other one of the crankshaft and the timing gear.

According to (1), when the crankshaft and the timing gear are erroneously assembled, relative positional displacement occurs between the crankshaft and the timing gear only by the height of the erroneous-assembling prevention ribs in addition to the height of the fitting projection, so that the erroneous assembling can be easily recognized.

(2) The engine according to (1) further includes:
a crankcase body (a crankcase body 19) that includes a bottom portion (a bottom portion 19a) including a first crankshaft insertion hole (a first crankshaft insertion hole 19d), and a tubular portion (a tubular portion 19c) that is formed integrally with the bottom portion at one end portion in a first direction, and includes a case opening portion (a case opening portion 19b) at the other end portion in the first direction;
a crankcase cover (a crankcase cover 20) that includes a second crankshaft insertion hole (a second crankshaft insertion hole 20a) and covers the case opening portion of the crankcase body;
a cylinder base portion (a cylinder base portion 21a) to be positioned inside the crankcase body; and
a cylinder block (a cylinder block 21b) to be positioned outside the crankcase body,
in which the crankshaft is inserted through the first crankshaft insertion hole and the second crankshaft insertion hole along the first direction,
the first direction is an up-down direction of the engine, and
the crankcase cover is detachably attached to an upper portion of the crankcase body.

According to (2), the crankcase cover is detachably attached to the upper portion of the crankcase body, so that during the maintenance of the engine, the inside of the crankcase body can be accessed from above by removing the crankcase cover. In particular, when replacing the crankshaft, the crankshaft can be easily replaced by removing the crankcase cover and extracting the crankshaft.

(3) In the engine according to (2),
a camshaft (a camshaft 25) that meshes with the timing gear is provided inside the crankcase body, and the timing gear and the camshaft are disposed below the cylinder base portion.

According to (3), the timing gear and the camshaft are disposed below the cylinder base portion, so that during the maintenance of the engine, the inside of the crankcase body can be accessed from above only by removing the crankcase cover even without removing the timing gear and the camshaft. When the crankshaft is assembled from above in a state where the timing gear has been disposed, a fitting state between the fitting projection and the fitting recess cannot be recognized due to the interference of the crankshaft. However, when the crankshaft and the timing gear are erroneously assembled, relative positional displacement occurs between the crankshaft and the timing gear by the height of the erroneous-assembling prevention ribs in addition to the height of the fitting projection, so that the erroneous-assembling can be easily recognized.

(4) The engine according to (2) or (3) further includes
a valve mechanism (a valve mechanism 9),
in which the valve mechanism includes:
the timing gear (a timing gear 24) to be fixed to the crankshaft;
the camshaft (the camshaft 25) that is rotatably supported by the bottom portion of the crankcase body;
a pair of lifters (lifters 27) that are swingably supported by the bottom portion of the crankcase body;
a pair of rocker arms (rocker arms 29) which are swingably supported via a rocker arm shaft (rocker arm shafts 28) and whose one end portion abuts against an intake valve (an intake valve 5) or an exhaust valve (an exhaust valve 6);
a pair of push rods (push rods 30) to connect the pair of lifters to the other end portions of the pair of rocker arms; and
a pair of valve springs (valve springs 31) to respectively urge the intake valve and the exhaust valve in a valve closing direction, and
the pair of push rods are accommodated in a push rod accommodation portion (a push rod accommodation portion 21e) formed at a lower portion of the cylinder block.

According to (4), the pair of push rods of the valve mechanism are accommodated in the push rod accommodation portion formed on the lower portion of the cylinder block, so that during the maintenance of the engine, the inside of the crankcase body can be accessed from above only by removing the crankcase cover even without removing the push rod. In addition, the push rod accommodation portion is formed integrally with the lower portion of the cylinder block, so that the number of components can be reduced, and the manufacturing cost can be reduced.

REFERENCE SIGN LIST

E Engine
2 Crankshaft
2h Fitting recess
2i Erroneous-assembling prevention rib
5 Intake valve
6 Exhaust valve
9 Valve mechanism
19 Crankcase body
19a Bottom portion
19b Case opening portion
19c Tubular portion 19d. First crankshaft insertion hole
19e Cylinder insertion hole
20 Crankcase cover
20a Second crankshaft insertion hole
21 Cylinder unit
21a Cylinder base portion
21b Cylinder block
21e Push rod accommodation portion
24 Timing gear
24d. Fitting projection
25 Camshaft
27 Lifter
28 Rocker arm shaft
30 Rocker arm
31 Push rod

The invention claimed is:

1. An engine comprising:
a crankshaft; and
a timing gear configured to be attached to the crankshaft so as to rotate integrally with the crankshaft,
wherein a fitting projection which projects along the axial direction of the crankshaft is provided on either one of the crankshaft and the timing gear, and
a fitting recess configured to be concave in a same direction as a projecting direction of the fitting projection and configured to be fitted with the fitting projection, and erroneous-assembling prevention ribs configured to sandwich the fitting recess in a circumferential direction are provided on the other one of the crankshaft and the timing gear and configured to project in the direction opposite to the projecting direction of the fitting projection with respect to an engagement surface where the crankshaft and the timing gear are engaged around the fitting projection.

2. The engine according to claim 1 further comprising:
a crankcase body that includes a bottom portion including a first crankshaft insertion hole, and a tubular portion that is formed integrally with the bottom portion at one end portion in a first direction and includes a case opening portion at the other end portion in the first direction;
a crankcase cover that includes a second crankshaft insertion hole and is configured to cover the case opening portion of the crankcase body;
a cylinder base portion configured to be positioned inside the crankcase body; and
a cylinder block configured to be positioned outside the crankcase body,
wherein the crankshaft is inserted through the first crankshaft insertion hole and the second crankshaft insertion hole along the first direction,
the first direction is an up-down direction of the engine, and
the crankcase cover is detachably attached to an upper portion of the crankcase body.

3. The engine according to claim 2,
wherein a camshaft that meshes with the timing gear is provided inside the crankcase body, and
the timing gear and the camshaft are disposed below the cylinder base portion.

4. The engine according to claim 2 further comprising:
a valve mechanism,
wherein the valve mechanism includes:
the timing gear;
a camshaft that is rotatably supported by the bottom portion of the crankcase body;
a pair of lifters that are swingably supported by the bottom portion of the crankcase body;
a pair of rocker arms which are swingably supported via a rocker arm shaft, and whose one end portion abuts against an intake valve or an exhaust valve;
a pair of push rods configured to connect the pair of lifters to the other end portions of the pair of rocker arms; and
a pair of valve springs configured to respectively urge the intake valve and the exhaust valve in a valve closing direction, and
the pair of push rods are accommodated in a push rod accommodation portion formed at a lower portion of the cylinder block.

5. The engine according to claim 3 further comprising:
a valve mechanism,
wherein the valve mechanism includes:
the timing gear;
the camshaft that is rotatably supported by the bottom portion of the crankcase body;
a pair of lifters that are swingably supported by the bottom portion of the crankcase body;
a pair of rocker arms which are swingably supported via a rocker arm shaft, and whose one end portion abuts against an intake valve or an exhaust valve;
a pair of push rods configured to connect the pair of lifters to the other end portions of the pair of rocker arms; and
a pair of valve springs configured to respectively urge the intake valve and the exhaust valve in a valve closing direction, and
the pair of push rods are accommodated in a push rod accommodation portion formed at a lower portion of the cylinder block.

* * * * *